July 15, 1952

L. J. SCHANKE ET AL 2,603,375

ARTICLE ASSEMBLING MACHINE

Filed Jan. 29, 1949

INVENTORS
LEO J. SCHANKE and
WILBER W. VAWTER,
BY: Harold B. Hood
ATTORNEY.

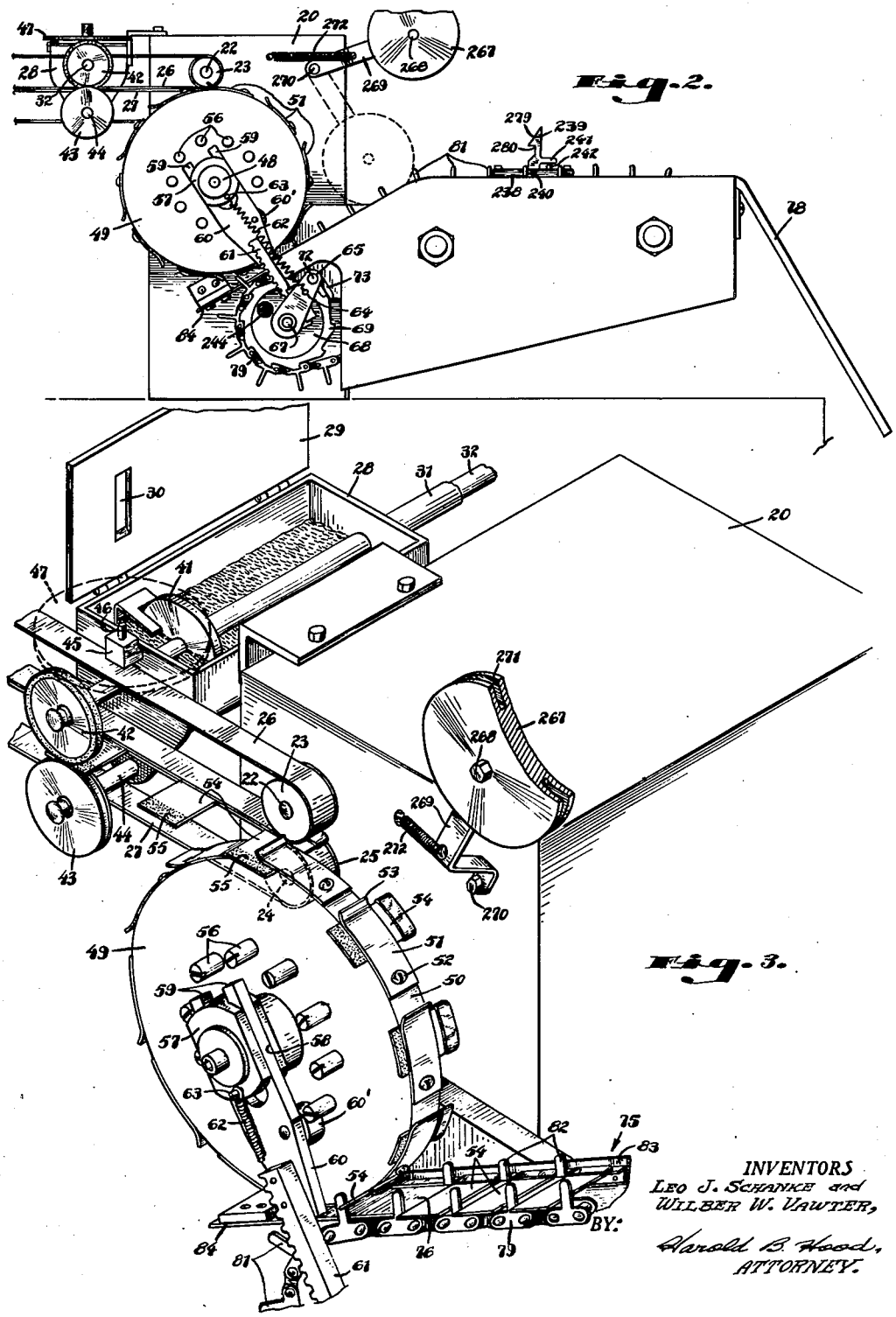

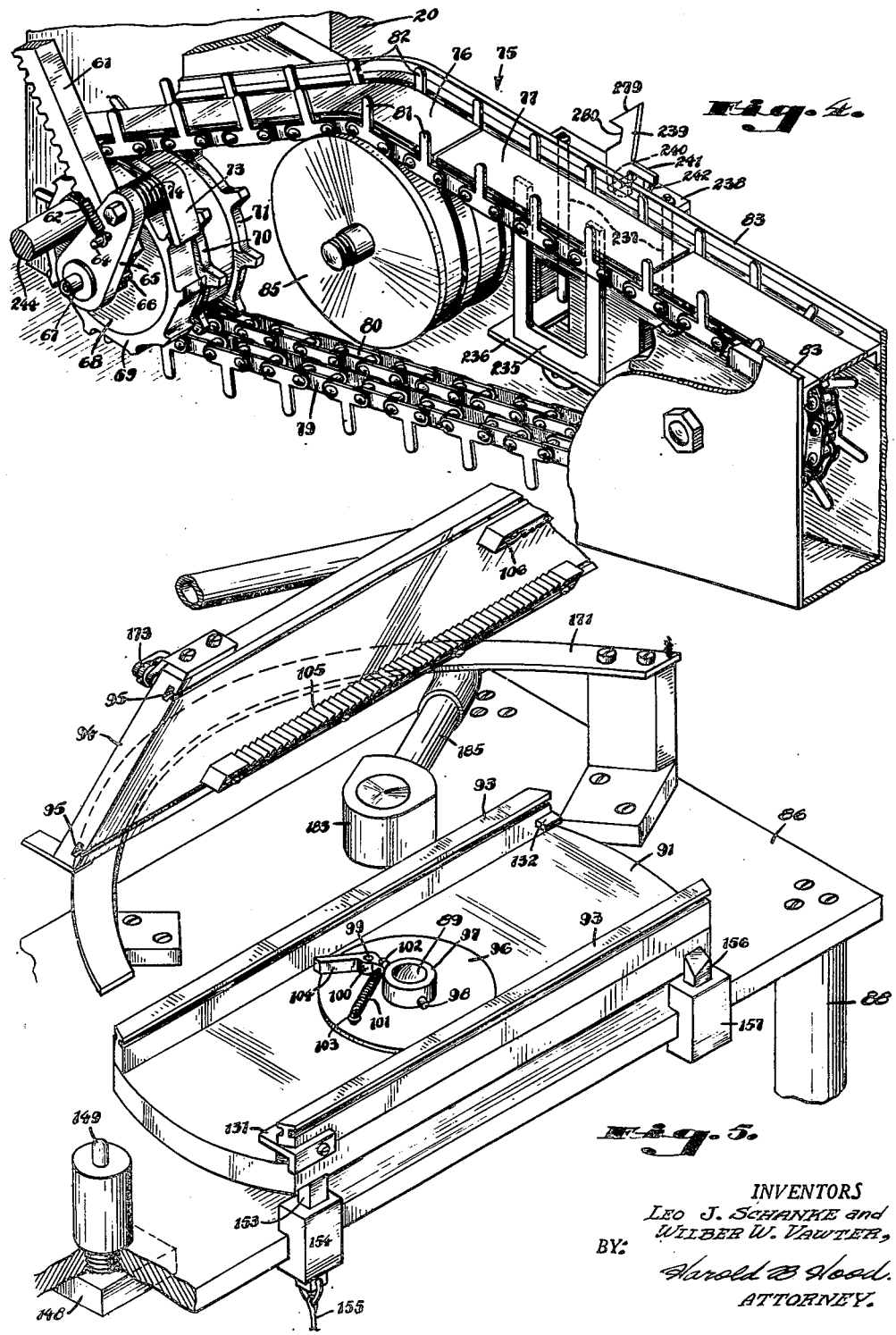

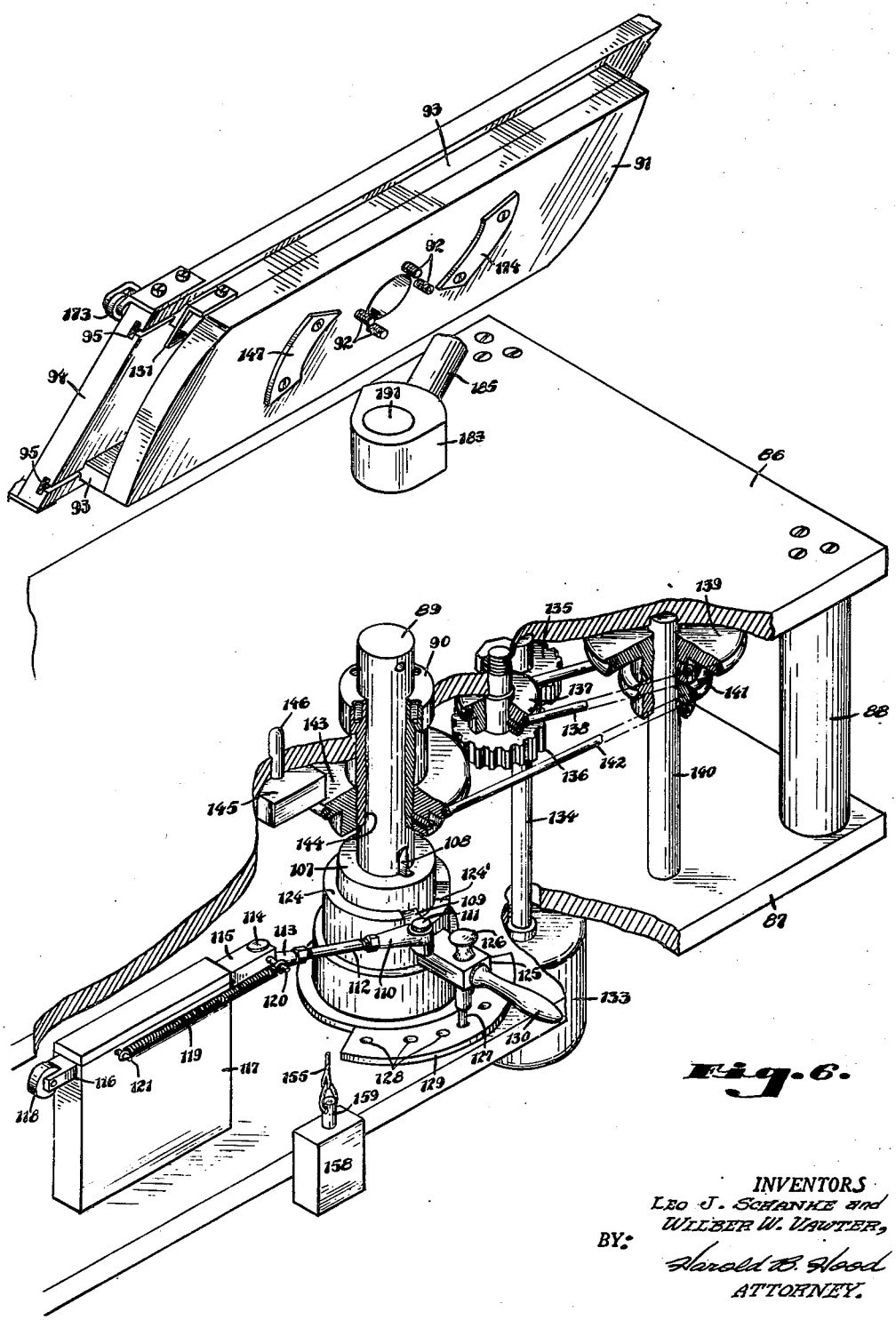

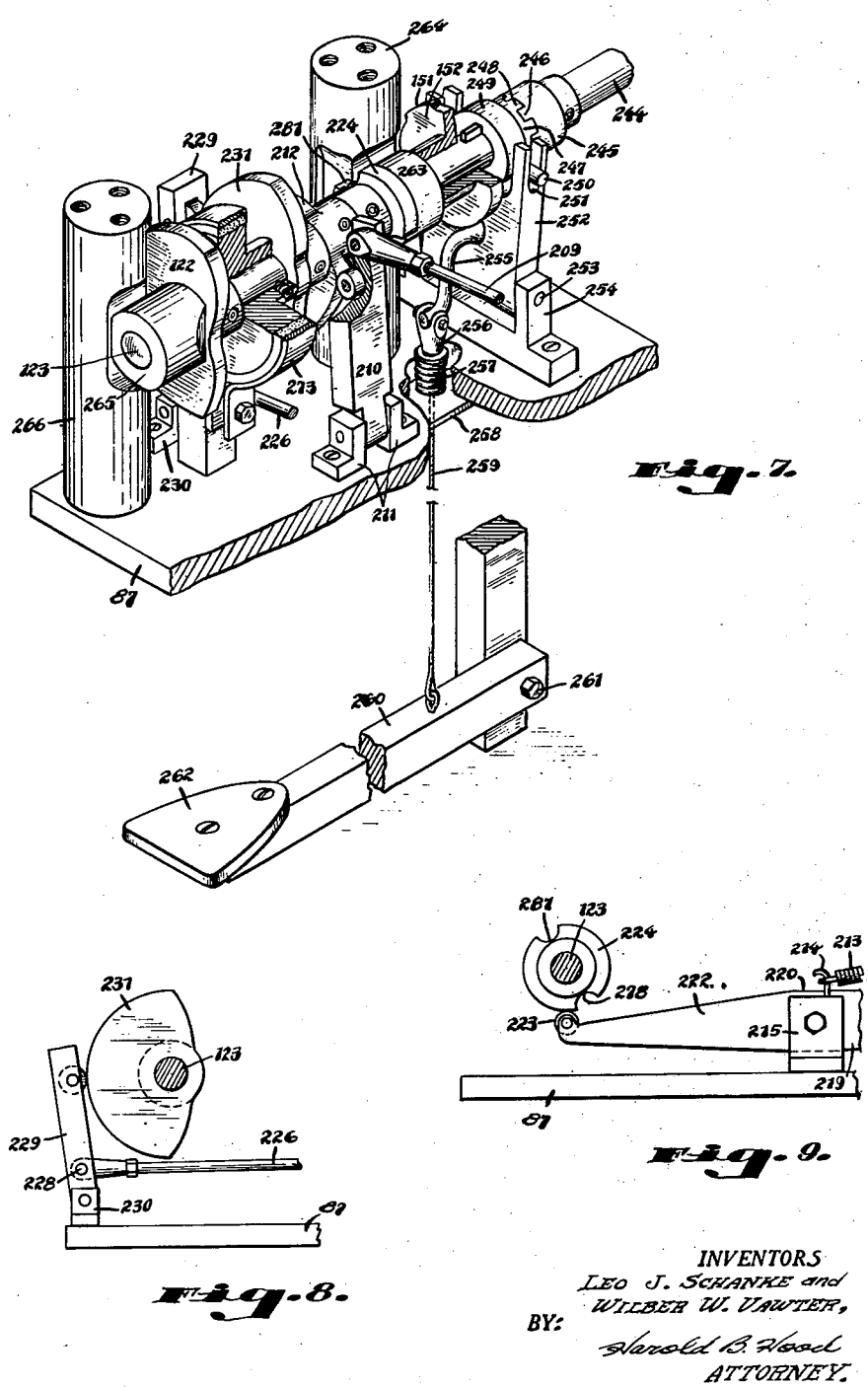

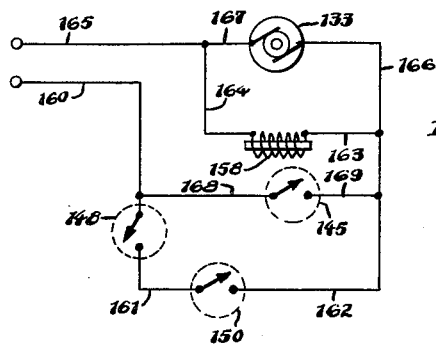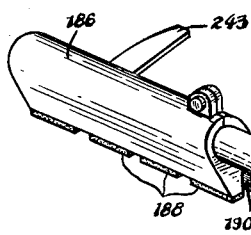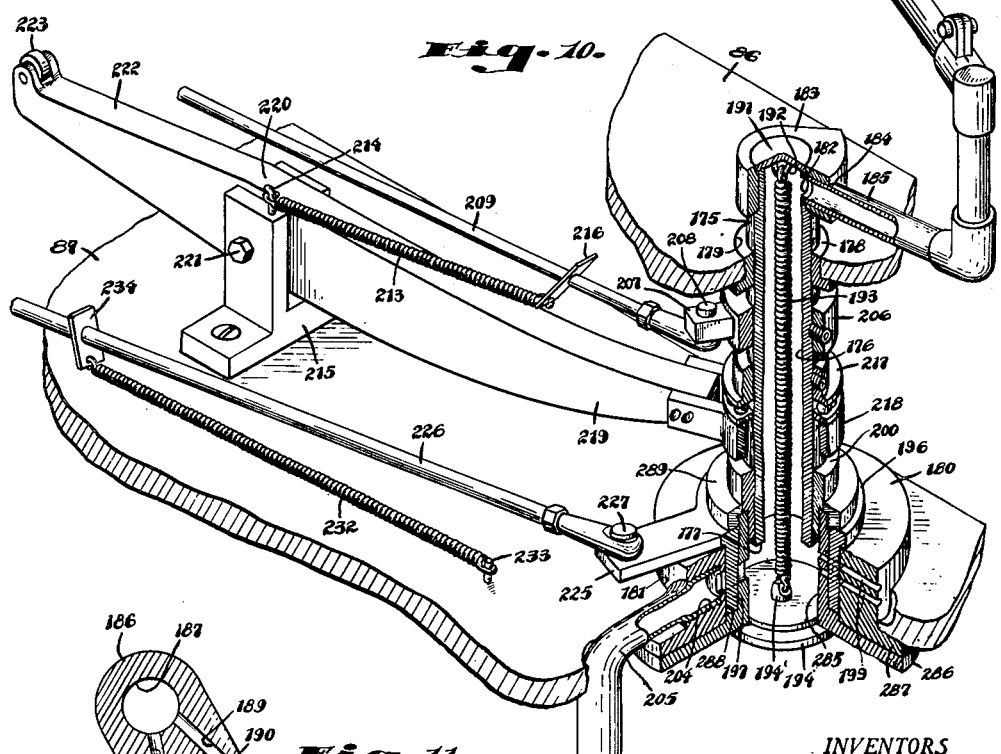

July 15, 1952 L. J. SCHANKE ET AL 2,603,375
ARTICLE ASSEMBLING MACHINE
Filed Jan. 29, 1949 7 Sheets-Sheet 7
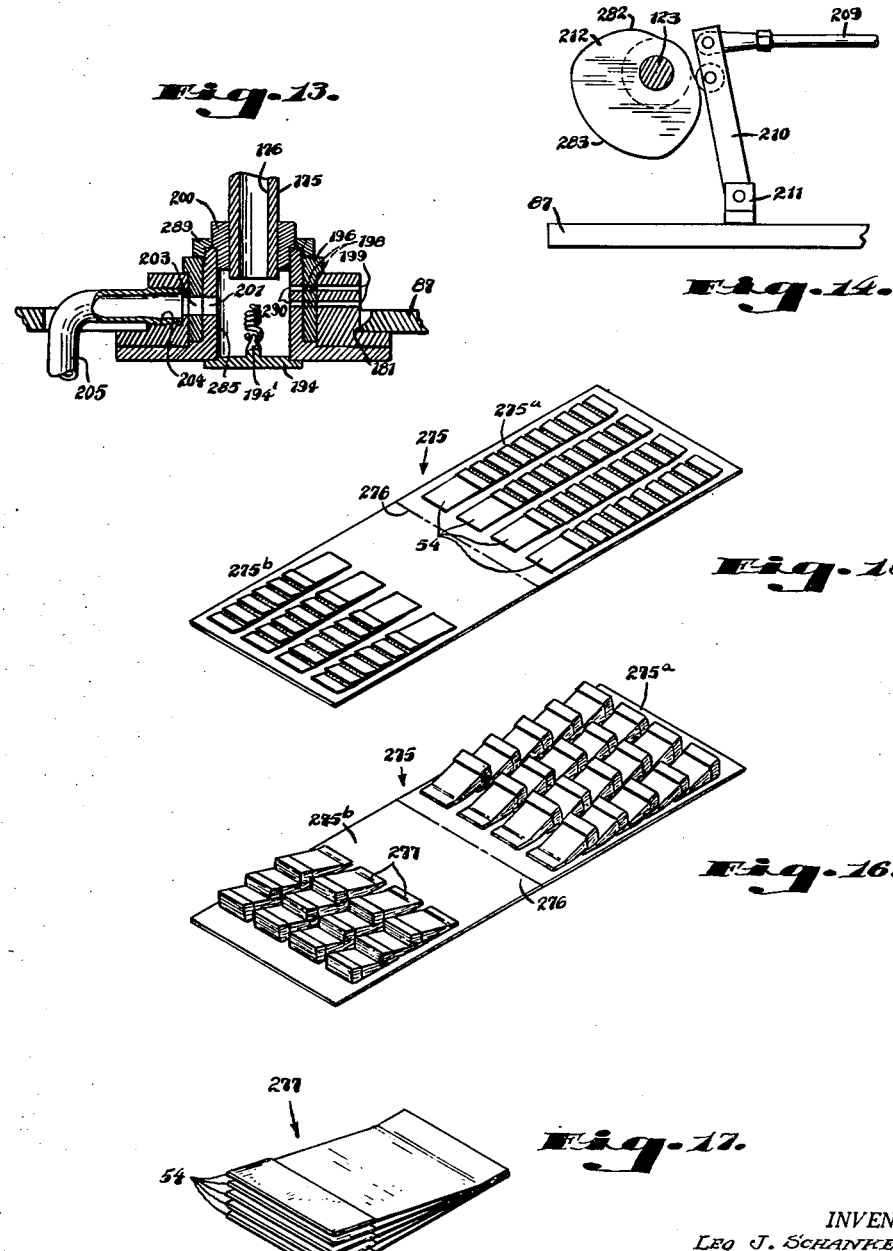
INVENTORS
LEO J. SCHANKE and
WILBER W. VAWTER,
BY:
Harold B. Hood.
ATTORNEY.

Patented July 15, 1952

2,603,375

UNITED STATES PATENT OFFICE 2,603,375

ARTICLE ASSEMBLING MACHINE

Leo J. Schanke and Wilber W. Vawter, Indianapolis, Ind.

Application January 29, 1949, Serial No. 73,655

31 Claims. (Cl. 216—14)

The present invention relates to an article assembling machine, and more particularly to a machine intended to produce a display card or similar carrier element, carrying a plurality of articles. More specifically, the machine of the present invention is designed and adapted to arrange duplicate articles, fed to the machine singly, in groups in serial arrangement, and to apply a plurality of such groups, in suitable arrangement, to a display card or the like.

The machine is particularly adapted to handling small articles having substantial length and breadth dimensions as compared to their thickness dimensions. Among the articles which the machine is adapted to handle are individual envelopes each containing one pill or one dose of medicinal powder, or folded paper strips carrying indicia, messages, information, or the like. The machine is adapted to secure one end of each such article to the display card or carrier element, leaving the opposite end, and most of the body portion of the article, free. Preferably, but not necessarily, the free end and most of the body portion of each article of each group will overlap one or more articles in one or more groups previously applied to the carrier element.

In at least some instances, the carrier elements are so proportioned and designed as to be readily foldable upon a transverse line located substantially at the longitudinal center of each element; and the machine is so constructed and designed as to secure a plurality of groups of articles to the carrier element in a region located between such fold line and one end of the carrier element with the free ends of the articles projecting toward such end of the carrier element, and to secure a plurality of other groups of articles in the region between the fold line and the other end of the carrier element, with their free ends projecting toward said other end of the carrier element.

The primary object of the invention is to provide an improved machine which will automatically, and with a minimum of attention, arrange articles in such groups upon such carrier elements. A further object of the invention is to provide a machine so constructed and designed as to apply adhesive to each article handled, in a narrow transverse band adjacent one end of such article, and to press the articles against the carrier element in such fashion as to cause the adhesive so applied to secure each article to the carrier element. A further object of the invention is to produce a machine including parts adjustable to arrange the articles being handled in a fashion such that each article is separately attached to the carrier element or to arrange them in a fashion such that any desired number of articles may be stacked and secured together before attachment to the carrier element, whereby each group of articles will comprise a plurality of stacks of articles, the stacks being arranged serially before attachment to the carrier element, and each stack of articles being secured to the carrier element in the same manner above described in the discussion of arrangement of individual articles.

Further objects of the invention will appear as the description proceeds.

To the accomplishment of the above and related objects, our invention may be embodied in the form illustrated in the accompanying drawings, attention being called to the fact, however, that the drawings are illustrative only, and that change may be made in the specific construction illustrated and described, so long as the scope of the appended claims is not violated.

Fig. 2 is a front elevation of parts of the machine, the transfer mechanism and the means for supporting the carrier element having been removed;

Fig. 3 is an enlarged perspective view of the inverting means, means for feeding articles to the inverting means, adhesive-applying means, and part of the article positioning means;

Fig. 4 is a perspective view of the article positioning means and part of the drive mechanism therefor;

Fig. 5 is an exploded fragmentary perspective view of the means for supporting and manipulating the carrier element, parts of the transfer means being fragmentarily illustrated;

Fig. 6 is a fragmentary perspective view of the carrier-supporting and manipulating means, parts being broken away for clarity of illustration;

Fig. 7 is a broken perspective view of the cam shaft assembly and pedal-actuated clutch;

Fig. 8 is a fragmentary elevation showing the contour of the valve actuating cam;

Fig. 9 is a similar fragmentary elevation showing the contour of the post-elevating cam;

Fig. 10 is a fragmentary perspective view, parts being shown in section, of the transfer mechanism;

Fig. 11 is a transverse section through the transfer suction head;

Fig. 12 is a wiring diagram illustrating the driving means for rotation of the carrier element support;

Fig. 13 is a fragmentary sectional view, upon an enlarged scale, of the valving means for the transfer mechanism;

Fig. 14 is an elevation showing the contour of the post oscillating cam;

Fig. 15 is a perspective view of a carrier element partially filled with single articles;

Fig. 16 is a similar view of a carrier element partially filled with stacks of articles; and Fig. 17 is a perspective view of a single stack of articles.

Figure 1:
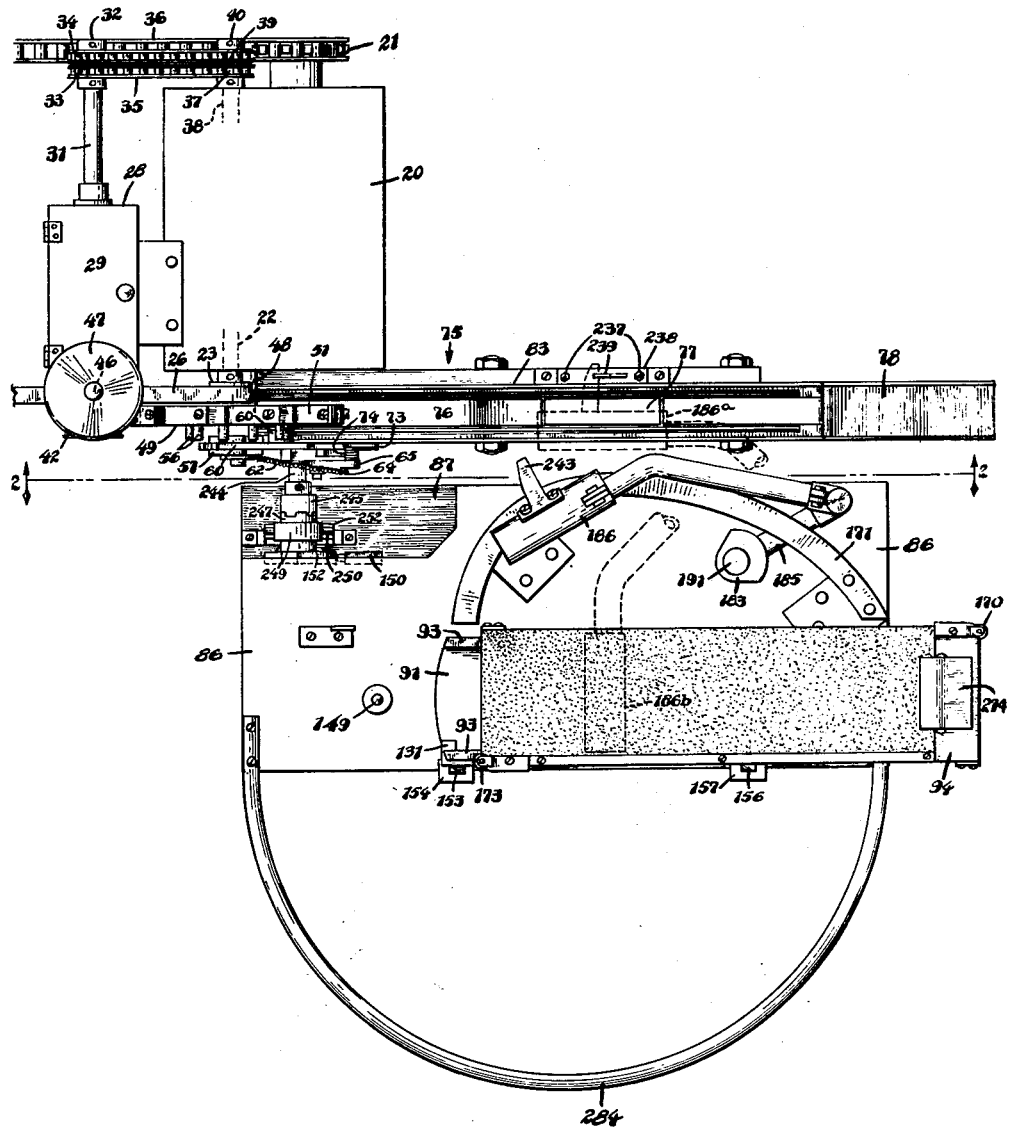
Fig. 1 is a plan view of a machine constructed in accordance with our invention, parts having been removed for clarity of illustration.

Referring more particularly to the drawings, it will be seen that we have illustrated the drive mechanism for the machine diagrammatically in the form of a gear box 20 having a power input element 21 which may be driven in any suitable fashion. An output shaft 22 projecting from the gear box, and driven at a suitable speed, carries a pulley 23 (Figs. 1 and 3). Vertically aligned with the shaft 22 is a second output shaft 24, driven oppositely at the same speed, and carrying a pulley 25. A belt 26 is trained over the pulley 23 and a companion (not shown) and a similar belt 27 is trained over the pulley 25 and a companion (not shown), the adjacent runs of said belts 26 and 27 moving, of course, in a common direction at a common speed and substantially in contact with each other.

Supported from the gear box 20 is a glue reservoir 28 preferably provided with a hinged cover 29 in which is formed a slot 30. A hollow shaft 31 extends into the reservoir 28, and encloses an independently rotatable shaft 32 which projects entirely through the reservoir. The shaft 31 carries a sprocket 33 (Fig. 1) and the shaft 32 carries a sprocket 34, chains 35 and 36 being trained over said sprockets, respectively, to drive the same from a sprocket 37 on an output shaft 38 and a sprocket 39 on an output shaft 40, the shafts 38 and 40 rotating in opposite directions at a common speed.

Within the reservoir 28, the shaft 31 carries a wheel 41 (Fig. 3) the lower portion of which dips into a supply of liquid adhesive in the reservoir, and the upper portion of which projects through a suitably formed slot 30 in the cover 29. At its outer end, and beyond the reservoir 28, the shaft 32 carries a glue spreading wheel 42 which peripherally registers with, and substantially engages, a support wheel 43 carried on a shaft 44 suitably driven in a direction opposite to the direction of rotation of the shaft 32. A block 45 supported on the reservoir 28 mounts a trunnion 46 upon which is journalled a glue transfer wheel 47 (Figs. 1, 2 and 3) which engages the peripheries of the wheels 41 and 42 to transfer glue from the pick-up wheel 41 to the spreader wheel 42.

A shaft 48 (Figs. 1 and 2) carries a wheel 49, upon whose periphery 50 is mounted a series of spring fingers 51, arranged in peripherally spaced relation. The leading end of each finger 51 is fixed to the periphery 50 of the wheel 49 by a machine screw 52 or the like, and the trailing end of each spring finger is free and flares away from the periphery of the wheel, as at 53.

Suitable means (not shown) feeds articles 54 to be handled between the adjacent runs of the belts 26 and 27, said articles being fed to said belts singly and at a predetermined uniform rate. As is clearly to be seen in Fig. 3, the articles 54 are grasped, intermediate their ends, between the adjacent runs of the belts 26 and 27, an end portion of each such article projecting laterally beyond said belts, and, by the travel of said belts, said articles are carried from the left toward the right as viewed in Figs. 2 and 3. The wheels 42 and 43 are so arranged with respect to the belts 26 and 27 that, as each article 54 is carried past said wheels, its projecting extremity moves between the wheels 42 and 43, whereby a narrow ribbon of adhesive 55 is spread by the wheel 42 on said projecting end portion of each article 54.

The wheel 49 is driven in a clockwise direction, as viewed in Figs. 2 and 3, at a peripheral velocity less than the lineal velocity of the belts 26 and 27; and the wheel 49 is so indexed, with relation to the means for feeding articles 54 between the belts that, as each article 54 nears the plane common to the axes of the shafts 22 and 24, the trailing end of a finger 51 comes into tangency with the plane defined between the adjacent runs of the belts 26 and 27. Since the lineal velocity of the belts is slightly greater than the peripheral velocity of the wheel 49, the article 54 which is about to be discharged from between the belts 26 and 27 is slipped under the flaring end of the registering finger 51 and is pushed well into the pocket between said finger and the periphery of the wheel, as is clearly to be seen from an inspection of Fig. 3. The wheel 49 is so related to the belts 26 and 27 and to the plane of the wheel 42 that the finger 51 will grip a region of the article 54 between the adhesive ribbon 55 and the portion of said article previously gripped between the belts 26 and 27.

On its outer end face, the wheel 49 carries an annular series of angularly spaced striker elements or pins 56, said pins being individually readily removable from said wheel. The sockets or bores in which said pins are supported are uniformly spaced about the axis of the wheel 49 in a concentric series.

Loosely mounted on the end of the shaft 48 is a guide block 57 provided with diametrically opposed guide ways 58 in which are slidably received two furcations 59 at the upper end of a slide 60. On its surface facing the adjacent end surface of the wheel 49, said slide carries a roller 60'. A rack 61 is formed on or carried by the slide 60 for a purpose later to become apparent; and a spring 62 has one end anchored at 63 on the block 57 and its opposite end anchored at 64 upon an arm 65 (Figs. 2 and 4). The spring 62 tends to hold the slide 60 in a position such as to locate the axis of the roller 60' just outside the circle defined by the external surfaces of the pins 56 so that, as each pin 56 approaches the slide 60, it will strike the roller 60' and, by a cam action against said roller, shift the slide 60 and the rack 61 radially outwardly.

A pinion 66 (Fig. 4) is fixedly associated with the arm 65, said arm and pinion being oscillably mounted upon a trunnion 67 projecting axially from a hub 68 fixedly projecting from an end wall of the gear box 20. A ratchet wheel 69 and a pair of sprockets 70 and 71 are rotatably mounted upon the hub 68. A pivot pin 72 at the outer end of the arm 65 oscillably supports a pawl 73 and a spring 74 which resiliently urges the pawl toward engagement with the teeth of the ratchet wheel 69.

A chute, indicated generally by the reference numeral 75, is provided with a continuous floor 76, one section 77 of which is arranged for reciprocating movement out of the general plane of said floor. Beyond the section 77, we preferably provide a discharge section 78 (Figs 1 and 2).

Two chains 79 and 80 are trained over the sprockets 70 and 71 and over companion sprockets (Fig. 4) at the opposite end of the conveyor assembly. The chain 79 is provided with longitudinally spaced, upstanding fingers 81, and the chain 80 is provided with a similarly spaced series of similar fingers 82, one of the fingers 82 registering with each of the fingers 81. Thus, a longitudinally spaced series of individual compartments is defined by the two series of fingers 81 and 82. Preferably, one side of the chute 75 may be guarded by an upstanding rail 83; and, in some installations, the opposite side of said chute will be guarded by a similar rail. The lefthand end of the chute 75, indicated at 84 in Fig. 3, is disposed substantially in the vertical plane of the axis of the shaft 48, and immediately adjacent the lowermost portion of the periphery of the wheel 49. Thus, as the chains 79 and 80 move in a clockwise direction, the fingers 81 and 82 straddle the oppositely moving adjacent section of the wheel 49, and engage the oppositely projecting end portions of the articles 54 carried on said wheel periphery. The timing of the parts of the machine is such that each registering pair of fingers will move into straddling relation with the wheel 49 in time to engage an approaching article 54, whereby an article 54 will be deposited in each successive compartment defined by the fingers 81 and 82 (see Fig. 3). Of course, as the wheel 49 rotates in a clockwise direction as viewed in Fig. 3, and the fingers 81 and 82 are moving toward the right as viewed in Fig. 3, engagement between an article 54 and a pair of fingers 81 and 82 will draw the article past the free end of its retaining spring finger 51.

Suitable supporting wheels 85 are provided for guiding the chains 79 and 80.

As the fingers 81 and 82 move longitudinally of the chute 75, articles 54 retained therebetween will be caused to slide along the floor 76 of the chute 75, and ultimately a plurality of such articles will be located, in serial arrangement, upon the floor section 77.

A platform 86 (Figs. 1, 5 and 6) is arranged adjacent the chute 75 and at a level somewhat below the illustrated plane of the chute floor section 77. Said platform is supported above the plane of a second platform 87 by spacer posts such as that one illustrated at 88.

A vertically arranged shaft 89 is suitably journalled and supported in and upon the platforms 86 and 87 and projects upwardly above the plane of the platform 86 (see Fig. 6). A collar 90 is sleeved on the upper portion of said shaft 89 for independent coaxial rotation relative thereto; and a carriage 91 is fixed to said sleeve 90, as by screws 92 taking into suitably tapped sockets in the upper end of the sleeve 90.

The carriage 91 provides a longitudinally extending trackway comprising laterally spaced rails 93, 93 (see Figs. 5 and 6) for slidably supporting a table 94 which is provided in its under surface with grooves 95 cooperatively mounted upon the rails 93. As shown, the rails and grooves are of T-cross section, and this arrangement is believed to be preferable.

The shaft 89 projects through the carriage 91 and, in the space between the upper face of the carriage and the lower face of the table 94, mounts a disc 96 through the medium of a hub 97 carrying a set screw 98 whereby said disc is secured to the shaft 89. At a suitable eccentric point, the disc 96 mounts a trunnion 99 upon which is pivotally supported a pawl 100, a spring 101 having one end anchored at 102 to the inner arm of said pawl and its other end anchored at 103 on the disc 96, tending always to throw the outer arm 104 toward the adjacent rail 93. On its under surface, the table 94 mounts two racks 105 and 106, each extending from a point near the longitudinal center of the table toward one end thereof, said racks projecting in opposite directions. Obviously, when the table 94 is assembled with the carriage 91 in the relation suggested in Fig. 5, the pawl arm 104 will cooperatively engage the rack 105; but if the carriage 91 is rotated through 180°, the pawl arm 104 will thereafter cooperatively engage the rack 106.

A collar 107 is sleeved on the lower portion of the shaft 89 and is rotationally secured to said shaft by keying means 108. A lever 109 projects radially from said collar 107 and a fitting 110 is pivoted at 111 to the projecting end of said lever 109, said fitting threadedly receiving one end of a rod 112 the opposite end of which is threadedly engaged in a fitting 113 pivoted at 114 upon a slide 115 reciprocably received in a guideway 116 formed on a block 117 supported on the platform 87. At its opposite end, the slide 115 carries a roller 118; and the spring 119, anchored at 120 on the slide 115 and at 121 on the block 117, resiliently urges the slide 115 in a direction to turn the shaft 89 in a clockwise direction, as viewed from above. A cam 122 (Fig. 7) is mounted upon a cam shaft 123 and is aligned in operative registry with the roller 118. It will be seen that the spring 119 urges the roller 118 toward the axis of the cam shaft 123.

Sleeved upon the collar 107 for independent concentric oscillation with respect thereto is a cylindrical block 124 provided with a peripherally extending notch 124' in which is engaged the lever 109. An arm 125 radially projecting from the block 124 carries a pin 126 whose lower end 127 is spring pressed downwardly for selective engagement in any one of a plurality of sockets 128 formed in a plate 129 in a series concentric with the shaft 89. A handle 130 projects from the arm 125 to facilitate manipulation of the block 124.

It will be seen that, as the cam shaft 123 rotates, each revolution of the cam 122 will be accompanied by an oscillatory cycle of the shaft 89 carrying the plate 96; and that each cycle of the shaft 89 will produce a vibratory cycle of the pawl arm 104 generally in the direction of length of the carriage 91. The magnitude of the cycle of the pawl arm 104 will, of course, be dependent upon the current position of the block 124 as determined by the selection of the socket 128 in which the pin end 127 is currently engaged, since the engagement of the lever 109 with the lefthand end of the notch 124', as viewed in Fig. 6, will limit the degree of movement of the pawl toward the right, as viewed in Fig. 5.

Obviously, since the pawl arm 104 is in cooperative relation with the rack 105, each vibratory cycle of said pawl will shift the table 94 toward the left as viewed in Fig. 5, and the magnitude of table movement in response to a pawl cycle will likewise depend upon the current position of the block 124.

At its opposite ends, the carriage 91 is provided with stops 131 and 132 (Fig. 5) engageable, respectively, by the racks 106 and 105, to limit longitudinal movement of the table 94 with respect to said carriage.

An electric motor 133 (Figs. 6 and 12) is suitably supported from the platform 87, and its spindle 134 carries a pinion 135 meshing with a gear 136 to which is fixed a pulley 137 driving, through a belt 138, a pulley 139 on a shaft 140 supported between the platforms 86 and 87. Likewise fixed to the shaft 140 is a pulley 141 driving, through a belt 142, a pulley 143 fixed to the lower end 144 of the sleeve 90. Thus, when the motor 133 is energized, the sleeve 90 will be driven, through a reducing friction drive.

A switch 145, provided with an actuating button 146, is fixed to the platform 86, said button projecting into cooperative relation with a segment plate 147 fixed to the bottom surface of the carriage 91. As long as the button 146 is engaged by the plate 147, the switch 145 will be open, as indicated in Fig. 12. A switch 148 (Figs. 1, 5 and 12) is supported on the platform 86 and is provided with an actuating button 149. So long as the button 149 is free, the switch 148 will be open as indicated in Fig. 12. The button 149 is located in the path of the table 94 and, as said table nears the limit of its path of movement under the influence of the vibrating pawl 100, its forward end will engage the button 149 to depress said button to close the switch 148.

A further switch 150 (see Figs. 1 and 12) is mounted on the platform 86 adjacent the cam shaft 123; and a high spot 151 on a cam 152 carried by said cam shaft engages an element of said switch 150 at one point in each revolution of the shaft 123 to close said switch 150, which is otherwise open as indicated in Fig. 12.

A latch bar 153, carried in a box 154 suitably secured to the platform 86, and spring-urged into the position illustrated in Fig. 5, normally engages the carriage 91 to hold the same against movement, about the axis of the shaft 89, in a counter-clockwise direction as viewed from above. A cable 155 is fixed to the latch bar 153 for a purpose later to become apparent. Also supported upon the platform 86 is a second latch bar 156, carried in a box 157 and spring-urged into the position illustrated in Fig. 5, said latch bar being effective to hold the carriage 91 against clockwise movement about the axis of the shaft 89. It will be seen that the upper end of the bar 156 is beveled so that it will be automatically cammed downwardly when struck by a portion of the carriage moving in a counter-clockwise direction.

A solenoid 158 (Fig. 6) having a core 159 is suitably secured to the platform 87, and the cable 155 is anchored to said solenoid core 159 whereby actuation of the solenoid core will draw the latch bar 153 downwardly to release the carriage 91 for counter-clockwise rotation about the axis of the shaft 89.

From an inspection of the wiring diagram of Fig. 12, it will be seen that the switches 148 and 150 are connected in series in an energizing circuit for the motor 133 and a parallel circuit for the solenoid 158; and that the switch 145 is connected in a circuit including the motor and the solenoid but independent of the switches 148 and 150. It will be remembered that the switch 145 is normally held open by depression of its button 146, that the switch 148 is normally open but can be closed by depression of its button 149, and that the switch 150 is normally open but is momentarily closed by the cam 152 for an instant during each revolution of the cam shaft 123.

As the table 94 is indexed toward the left, step by step, by vibratory movement of the pawl 100, its leading end will ultimately strike the button 149 to close said switch 148. When next the high spot 151 of the cam 152 strikes the switch 150, energizing circuits for the solenoid 158 and the motor 133 will be closed. Such circuits may be traced, in Fig. 12, from line wire 160 through switch 148, wire 161, switch 150, wire 162, wire 163, solenoid 158, and wire 164 to line wire 165 to energize the solenoid; and through wire 166, motor 163, and wire 167, to energize the motor. Thereby the latch bar 153 will be drawn out of retaining relation with the carriage 91 and the motor 133 will act to drive the sleeve 90 in a counter-clockwise direction.

Initiation of such movement of the carriage 91 will move the rack 105 out of cooperative relation with the pawl arm 104. Before the table 94 moves out of engagement with the button 149 of switch 148, the segment plate 147 will release the button 146 to permit closure of the switch 145. Thus, a holding circuit for the motor and the solenoid will be established from line wire 160, through wire 168, switch 145, wire 169, wire 162, wire 163, solenoid 158, wire 164 to line wire 165, and through wire 166, motor 133, and wire 167 to line wire 165.

As will be apparent from an inspection of Fig. 1, movement of the table 94 toward the left to a degree sufficient to engage its leading end with the button 149 will bring the roller 170, carried at the trailing corner of the table 94, into registry with the inner surface of a cam rail 171. A similar roller 173 is mounted in a corresponding position at the opposite end of the table 94. As the table swings in a counter-clockwise direction, the roller 170 will follow the contour of the cam rail 171, whereby the table end carrying the roller 170 will be shifted to starting position.

As the carriage 91 nears completion of a 180° swing, the segment plate 174, similar to, but oppositely located with respect to, the plate 147, will strike the button 146 to open the switch 145. Thereby the holding circuit for the motor and for the solenoid 158 will be broken, and the latch bar 153 will be spring-returned to its position illustrated in Fig. 5. Since no brake means is provided for the carriage 91 the carriage will continue to rotate until it strikes the latch bar 153, at which instant the lower surface of the table will clear the latch bar 156, which will spring back to its position illustrated in Fig. 5.

Now, the rack 106 is positioned for cooperative engagement by the pawl arm 104, and the cycle above-described will be continued.

A hollow post 175 (Fig. 10) is suitably mounted for axial reciprocation and oscillation between the platforms 87 and 86, said post projecting above the platform 86. Said post provides interiorly a chamber 176 open at its lower end 177. Near its upper end, the post 175 is journalled in a bushing 178 fitted into a perforation 179 in the platform 86, and its lower end is journalled, in a manner later to become apparent, in a cylindrical fitting 180 suitably secured in an opening 181 in the platform 87.

Near its upper end, the post 175 is provided with a radial port 182 enclosed in a head 183 provided with a registering port 184 in which is fixed a conduit 185 which, at its remote end, carries a hollow suction head 186. Said head is formed to provide a chamber 187 (Fig. 11), from which a plurality of passages 189 lead to suction ports in a face plate 188 carried upon a downwardly presented surface of the head 186. Said head is preferably provided with a longitudinally extending socket 190 adapted to straddle the fingers 81 of the chain 79 when the face plate 188 is pressed against articles supported upon the floor section 77 of the chute 75. The parts are so proportioned and designed that the head 186 may be swung between the position indicated at 186a in Fig. 1 and that indicated at 186b therein.

In the illustrated embodiment of the invention, the upper end of the post 175 is closed by a cap 191 carrying, on its inner surface, an eyelet 192 to which is anchored one end of a spring 193, the other end of said spring being anchored to an eyelet 194' on a floor piece 194.

A bushing 285, having a terminal flange 286 belted or otherwise suitably secured to the flange 287 of the fitting 180 and to the lower surface of the platform 87, penetrates the bore of the fitting 180, defining therewith an upwardly-opening annular channel 288 in which is journalled for oscillation the barrel 197 of a valve element 196. Said valve element barrel is formed with a plurality of ports 198 adapted to be moved, by oscillation of said valve member, into and out of registry with a corresponding series of similarly spaced ports 199 opening through the wall of the fitting 180 to atmosphere. A nut 289 threadedly engages the projecting upper end of the bushing 285 to retain the valve element 196 against axial movement, and said nut frictionally engages and retains a bushing 200 in which the post 175 is guided for reciprocatory and oscillatory movement. The valve element barrel 197 is further formed with a port 203 which, in one position of the valve element, registers with a port 201 in the bushing 285, and with a port 204 in the fitting 180, in which is received an end of a conduit 205 leading to a vacuum pump or chamber (not shown).

The floor piece 194, as shown, closes the lower end of the chamber 176; and it will be seen that, when the port 203 registers with the ports 201 and 204, that chamber communicates with the conduit 205 and the vacuum source; while, when the ports 198 register with the ports 199 and the ports 290 in the bushing 285, the chamber 176 is in open communication with the atmosphere. The open lower end 177 of the post 175 never reaches sealing contact with the floor piece 194; and the bushing 200 spaces the post 175 radially from the bushing 285 so that the post 175 never seals the ports 290 or 201.

Fixed to the post 175 between the platforms 86 and 87 is a collar 206 having a radially projecting finger 207 to which is pivotally connected, at 208, one end of a rod 209 the opposite end of which is pivoted to a lever 210 (Fig. 7) pivotally mounted upon a bracket 211 on the platform 87 near the cam shaft 123; and a cam 212 (Figs. 7 and 14) on said shaft 123 cooperatively registers with said lever 210. A spring 213 (Fig. 10), having one end anchored at 214 on a bracket 215 carried on the platform 87, has its other end anchored at 216 to the rod 209, and resiliently retains the lever 210 in cooperative engagement with the cam 212.

A stop collar 217 fixed to the post 175 cooperates with the bushing 200 to retain a yoke 218 against axial movement relative to the post 175, said post being, however, oscillable about its axis without affecting the yoke 218. The yoke 218 is fixed to one arm 219 of a lever 220 pivoted, at 221, to the bracket 215 for oscillation about a horizontal axis. The other arm 222 of said lever 220 carries a roller 223 cooperatively engaging a cam 224 (Figs. 7 and 9) on the came shaft 123. It will be seen that the spring 193 acts to hold the roller 223 resiliently in cooperative engagement with the cam 224.

An actuating arm 225 projects radially from the valve member 196, and a rod 226 is pivotally connected to said arm 225 at 227, the opposite end of said rod being connected, at 228 (Fig. 8) to a lever 229 pivoted upon a bracket 230 on the platform 87, and cooperatively engaging a cam 231 on the cam shaft 123. A spring 232 has one end anchored at 233 upon the platform 87, its opposite end being anchored at 234 to hold said lever 229 resiliently in cooperative engagement with the cam 231.

The shiftable floor section 77 of the chute 75 (Fig. 4) is supported upon the legs of a U-shaped brace 235 which, in turn, is carried by a bracket 236 supported upon a pair of rods 237 suspended from a block 238. A latch finger 239 is pivotally mounted at 240 upon the plate 238 and is provided with a rearwardly extending spur 241 against which bears a spring-pressed pin 242 resiliently resisting clockwise movement of the finger 239 about its pivot 240. An arm 243 is carried by the head 186 in such a position as to cooperate with the finger 239.

A plurality of articles 54 having been positioned upon the floor section 77 in serial arrangement, and the head 186 being in the position illustrated in solid lines in Fig. 1, the cam 212 will be retreating from the lever 210, whereby the spring 213 will be swinging the post 175 in a clockwise direction. As the head 186 reaches the position indicated at 186a in Fig. 1, the roller 223 will drop into the notch 278 of the cam 224, whereby the spring 193 will be permitted to force the post 175 and the head 186 downwardly. As the arm 243 strikes the cammed surface 279 of the finger 239, the finger will be forced in a clockwise direction about its pivot 240 and the arm 243 will snap into the notch 280 of said finger. Instantly after the roller 223 drops into the notch 278, the high section of the cam 231 will come into cooperative engagement with the lever 229, whereby the port 203 will be brought into registry with the ports 201 and 204 to connect the interior 176 of the post 175 with the vacuum source. Thus, when the head 186 is dropped, its face plate 188, which may preferably be made of sponge rubber or some similarly compressible material, will contact the articles 54 positioned on the floor section 77, and those articles will be retained against said face plate by the effect of the vacuum.

Almost instantly, continued rotation of the cam 224 will lift the roller 223 out of the notch 278, whereby the lever 220 will be rocked to lift the post 175 and head 186. Upward movement of the floor section 77 being substantially unopposed, said floor section will be carried upwardly by the engagement of the arm 243 in the notch 280 of the finger 239, until said floor section reaches an elevation above the uppermost ends of the fingers 81.

Now, the portion 282 of the cam 212 engages the lever 210 to shift the rod 209 toward the right, thereby swinging the post 175 in a counter-clockwise direction. When the transfer means reaches the position indicated at 186b in Fig. 1, the notch 281 in the cam 224 will concurrently come into registry with the roller 223, whereby the transfer assembly will move downwardly under the combined effect of gravity and the spring 193 to cause the head 186 to press the articles carried thereby against the exposed face of the carrier 275. Just before the roller 223 drops into the notch 281, the high portion of the cam 231 will leave the lever 229, permitting the spring 232 to shift the rod 226 toward the right to move the port 203 out of registry with the port 204; and the timing of the mechanism is such as to move the ports 198 into registry with the ports 199 and 290 just after the post 175 drops to press the articles 54 carried thereby against the carrier 275 supported on the table 94, and during the dwell period throughout which the head 186 maintains such pressure. Thus, the vacuum will be broken and the articles will be released from the head 186. The adhesive bands 55, having been pressed against the carrier 275, will retain those articles in position on said carrier as the notch 281 leaves the roller 223 to re-elevate the post 175 and head 186.

The cam shaft 123 is driven, from an output shaft 244 (Figs. 1 and 7) independently projecting from the gear box 20, through a clutch comprising an element 245 fixed to the shaft 244 and having crown teeth 246, and an element 247 splined on the shaft 123 and having crown teeth 248 (Figs. 1 and 7). Sleeved on the element 247 for axial movement therewith is a collar 249 having oppositely projecting fingers 250 received in slots 251 in a plate 252 pivotally mounted at 253 in a bracket 254 carried on the platform 87. A lever 255 is fixed to the plate 252, and a connector element 256 is pivotally secured to the free end of the lever 255. A spring 257 is confined between the element 256 and a bracket 258 carried beneath the platform 87, said spring constantly urging the plate 252 toward clockwise movement as viewed in Fig. 7 to engage the teeth 248 of the element 247 with the teeth 246 of the element 245. A cable 259 extends from the element 256 to a lever 260 pivoted at 261 on a frame member and carrying a pedal 262.

Obviously, depression of the pedal 262 will swing the plate 252 in a counter-clockwise direction to retract the collar 249 and clutch element 247, thereby disengaging the teeth 248 to stop rotation of the cam shaft 123. Preferably, the cam shaft is provided with friction brake means, indicated at 273, to prevent over-run or coasting of the cam shaft when the clutch element 247 is retracted.

It will be seen that, if the pedal 262 is depressed and then immediately released, the ends of the teeth 248 will thereafter ride upon the ends of the teeth 246 until said teeth 246 reach registry with the next set of spaces between the teeth 248, whereupon the spring 257 will act to re-engage the teeth 248 between the teeth 246. The spacing between the clutch teeth is so related to the driving means for the chains 79 and 80 that, when the above-described operation occurs, one compartment between the fingers 81 and 82 will move past the floor section 77 during quiescence of the transfer mechanism. This arrangement is desirable, in certain operations for which the machine is adapted, in order to permit a counter article or separator article to be discharged through the trough 75 and the section 78 to a collector.

The cam shaft 123 is mounted in bearings 263 carried by a post 264 and 265 carried by a post 266.

As has been explained, the chains 79 and 80 are driven by means actuated by the pins 56 on the wheel 49, and said pins are readily removable. With the parts in the condition illustrated herein, the chains will be indexed forward to the extent of one compartment as each leaf 51 approaches tangency with the chains, so that one article 54 will be dropped into each such compartment. If predetermined pins 56 are removed from the wheel 49, it will be clear that more than one finger 51 will approach tangency with the chains between indexing movements of the chains. Thus, if eight of the pins 56 are removed, leaving only two diametrically opposed pins in the wheel, five articles 54 will be dropped into each compartment before the chains are moved forwardly. If every second pin is removed, two articles will be dropped into each compartment; or if nine pins are removed, ten articles will be dropped into each compartment. It will be clear that, regardless of the selected arrangement of the pins 56, an article 54, with the ribbon 55 of glue applied thereto, will be delivered to each finger 51 and will be carried to the chains and dropped into the chute 75 with its glued face presented downwardly. Where more than one article is dropped into each compartment, the glued surfaces of the articles superimposed on others will come into contact with the corresponding unglued surfaces of the next subjacent articles. A wheel 267 is pivotally mounted at 268 upon a bracket 269 pivoted at 270 upon the gear box 20; and a spring 272 is associated with the bracket 269 in toggle relation to hold said bracket either in the position illustrated in Fig. 3 or in a depressed position, indicated in broken lines in Fig. 2, in which the periphery of the wheel 267 registers with the glued regions of the articles 54 passing beneath said wheel through the chute 75. The periphery of the wheel 267 is slotted as at 271 to straddle the fingers 81. Under the action of the spring 272, the wheel 267 presses upon the glued regions of articles stacked in the compartments of the chains 79 and 80 to secure the articles of each stack together. Thereby, when the stacks, in serial arrangement, reach the floor section 77, and when the head 186 is pressed against the uppermost articles of a series of stacks, the articles of each stack will adhere together as the stacks are picked up by the head 186 for transfer to the carrier supported on the table 94. Since the glued surface of the lowermost article of each stack is downwardly exposed, when the head 186 presses those surfaces against the carrier on the table 94, and then releases the stacks, the stacks will be effectively secured to the carrier.

While the above description of structure has been supplemented by fragmentary descriptions of operation, it is believed that a running account of the action of the mechanism and its effect upon the articles passing therethrough may be of assistance toward a full understanding of our invention.

Articles to be assembled are arranged in a magazine (not shown) comprising a part of an article-feeding mechanism of known characteristics; and the lefthand ends of the belts 26 and 27 are arranged to receive articles individually from that feeding mechanism. Such articles, gripped in the manner shown in Fig. 3 between the adjacent runs of the belts 26 and 27, are carried toward the right as viewed in Figs. 2 and 3, one projecting end portion of each such article being disposed in the plane of the wheels 42 and 43.

Glue is picked up from the reservoir 28 by the wheel 41, is transferred therefrom to the wheel 47 which, in turn, transfers the glue to the wheel 42, and thereby is spread, in a narrow ribbon 55, upon the upper surface of the projecting portion of each advancing article 54.

The wheel 49 is rotating in a clockwise direction as viewed in Fig. 3, at a peripheral velocity somewhat less than the lineal velocity of the belts 26 and 27, the arrangement being such that the flaring free end 53 of each spring finger 51 approaches tangency with the adjacent runs of the belts 26 and 27 just as an article 54 is approaching the vertical plane common to the shafts 22 and 24. Each such article, thus, is pushed beneath a finger 51, the glued portion 55 of each article projecting beyond the limits of the engaging finger 51.

As the wheel 49 rotates, it carries the articles 54 through a path of approximately 180° to invert each article; and to bring the projecting ends of each article into engagement with a registering pair of fingers 81 and 82, which fingers stop the article while the wheel continues to rotate, thereby pulling the article out from beneath the finger 51 and allowing it to drop onto the floor 76 of the chute 75 within the space or compartment between adjacent fingers 81 and adjacent fingers 82.

If the full series of ten pins 56 is in place, a pin 56 will substantially concurrently strike the roller 60' to shift the element 60 downwardly as viewed in Figs. 3 and 4, and then to release said element. Such downward movement of the element 60 will, through the rack 61 and pinion 66, swing the arm 65 in a clockwise direction as viewed in Figs. 2 and 4, whereby the pawl 73, engaging a tooth of the ratchet 69, will move said ratchet, in a clockwise direction, carrying with it the sprockets 70 and 71, to shift the chains 79 and 80 to bring the next chain compartment into registry with the substantially tangent portion of the advancing wheel 49. Under those circumstances, the article carried by the next following finger 51 will be deposited in the next compartment, between adjacent fingers 81 and adjacent fingers 82. If, however, alternate pins have been removed, the chains will not be advanced until a second article 54 has been deposited on top of the first article dropped into a compartment.

When a pin 56 releases the roller 60', the element 60 and rack 61 will be returned to starting position by the spring 62, the pawl 73 being thus returned to engage the next tooth on the ratchet 69.

As the chains 79 and 80 advance, under the action of the driving mechanism just described, individual articles, or stacks of articles confined in the compartments defined by the fingers 81 and 82, will be caused to slide up the inclined portion of the chute floor 76 and so onto the floor section 77 whereon a plurality of individual articles or stacks of articles, as the case may be, will be positioned in serial arrangement. In the illustrated embodiment of the invention, the floor section 77 is of such dimensions that four articles or stacks of articles will be concurrently positioned thereon.

Now, the head 186 being located in the position indicated at 186a in Fig. 1, the roller 223 will drop into the notch 278 of the cam 224, and the head 186 will be lowered to engage all four articles, or stacks of articles, thus positioned on the floor section 77. Concurrently, the arm 243 strikes the cam surface 279 of the finger 239 to swing said finger about its axis 240 against the tendency of the spring pressed pin 242, and enters the notch 280 in said finger. The clutch elements 245 and 247 are, of course, engaged so that the cam shaft 123 is rotating; and the valve 196 is in the position in which the port 203 registers with the ports 201 and 204. As the cam 224 rotates to shift the roller 223 out of the notch 278, the head 186 is elevated, carrying with it the latch finger 239 and the floor section 77 which is connected thereto. As the head 186 reaches an elevation at which the floor section 77 lies substantially in the plane of the upper ends of the fingers 81 and 82, the surface 282 of the cam 212 engages the lever 210 to begin to swing the post 175 and its associated parts in a counterclockwise direction as viewed in Figs. 1 and 10, whereby the arm 243 is shifted out of engagement with the finger 239, and the floor section 77 is permitted to drop back to its illustrated position.

When the high portion 283 of the cam 212 engages the lever 210, the head 186 will have attained the position 186b, and thereupon the roller 223 drops into the notch 281 of the cam 224, whereby the head 186 is lowered to press articles carried thereby against the surface of a carrier 275 supported on the table 94. Preferably, a spring clip 274 will be mounted at one end of the table 94 to assist in holding carriers 275 on said table. At any suitable point in the traversing movement of the head 186, the cam 231 shifts the rod 226 toward the right as viewed in Figs. 8 and 10, to shift the port 203 out of registry with the ports 201 and 204; and after the head 186 is so lowered, said cam 231 will further move the ports 198 into registry with the ports 199 and 290 to break the vacuum in the chamber 176.

As the roller 223 moves out of the notch 281, the cam 122 acts upon the roller 118 of the slide 115 to shift the same toward the right as viewed in Fig. 6, whereby the pawl arm 104 (Fig. 5) coacting with the rack 105, moves the table 94 one step toward the left as viewed in Figs. 1 and 5. The magnitude of that step will, of course, depend upon the current adjustment of the handle 130 and block 124.

Now, the cam 212 will retreat from the lever 210 to permit the spring 213 to swing the post 175 and its associated elements in a clockwise direction, while the cam 231 acts upon the lever 229 to swing the valve member 196 in a clockwise direction to return the port 203 into registry with the ports 201 and 204. The parts are so timed that, by the time the head 186 has been returned to the position 186a, four compartments of the chains 79 and 80 will have been advanced onto the floor section 77, thus presenting four more articles or stacks, in serial arrangement, to be picked up by the head 186.

This cycle will be continued until all of the section 275a of the carrier 275 has been filled with articles 54. As the head 186 rises from its last delivery of articles to the section 275a, the table 94 will engage the switch button 149, and the high spot 151 on the cam 152 will engage the switch element 150, to close an energizing circuit, as hereinbefore described, for the motor 133 and the solenoid 158. Thereupon, the carriage 91 will be rotated through 180° and the table 94 will be shifted relative to said carriage by the cam rail 171 to bring the free end portion of the carrier section 275b into position for engagement therewith of the next series of articles carried by the head 186.

When the section 275b has been filled, the table 94 will again engage the button 149 and, when the switch 150 is closed, the carriage will again be rotated through 180° to return to its starting position. Now the operator will remove the filled carrier 275 from the table 94 and place a new carrier thereon, engaging the holder 274 with such new carrier to retain the same in position during further operation of the machine.

Preferably, but not necessarily, a guard rail 284 will be secured to the platform 86 simply to remind the operator not to approach so close to the platform 86 as to be struck by the outer end of the carriage 91 as it swings about the axis of the shaft 89.

We claim as our invention:

1. An article assembling machine comprising means for supporting a carrier element, means for positioning a group of articles in serial arrangement adjacent said supporting means, transfer means for shifting said group of articles from said positioning means to said carrier element, means for indexing said supporting means after deposit on said carrier element of a group of articles, and means operable after deposit of a plurality of groups of articles on said carrier element to reverse the position of said supporting means and carrier element to bring a new portion of said carrier element into cooperative relation with said transfer means.

2. An article assembling machine comprising means for supporting a carrier element, means adjacent said supporting means for positioning a plurality of articles in a predetermined serial arrangement in a group, transfer means operable to remove a group of articles from said positioning means and deposit such group on said carrier element while maintaining such serial arrangement in said group, means automatically operable, after the deposit of a group on said carrier element, to shift said supporting means and carrier element relative to said transfer means, and means automatically operable after shifting of said supporting means to a predetermined degree, to reverse the position of said supporting means and carrier element.

3. An article assembling machine comprising means for supporting a carrier element, means adjacent said supporting means for positioning a plurality of articles in a predetermined serial arrangement in a group, transfer means operable to remove a group of articles from said positioning means and deposit such group on said carrier element while maintaining such serial arrangement in said group, means automatically operable, after the deposit of a group on said carrier element, to shift said supporting means and carrier element relative to said transfer means, means automatically operable after shifting of said supporting means to a predetermined degree, to reverse the position of said supporting means and carrier element, and means automatically operable, after such reversal, to shift said supporting means and carrier element relative to said transfer means after each subsequent depositing action of said transfer means.

4. In a device of the class described, a carriage providing a substantially planar trackway, means supporting said carriage for rotation about a substantially central axis substantially perpendicular to the plane of said trackway, a table supported by said trackway for movement therealong, means operable to move said table along said trackway, and means automatically actuated as a result of such movement to a predetermined degree, to turn said carriage about said axis.

5. The device of claim 4 including means cooperating with said table, during turning movement of said carriage, to shift said table to a new starting position relative to said carriage.

6. The device of claim 5 including means operable after such turning movement to move said table along said trackway in the opposite direction relative to said carriage.

7. In a device of the class described, a carriage providing a substantially planar trackway, means supporting said carriage for rotation about a substantially central axis substantially perpendicular to the plane of said trackway, a table supported by said trackway for movement therealong, a pawl mounted adjacent said trackway for vibratory motion generally longitudinally of said trackway, means for driving said pawl through its vibratory path, ratchet means operatively connected to said table and engageable by said pawl to shift said table step-by-step in one direction along said trackway, means actuated upon movement of said table to a predetermined degree in said one direction to rotate said carriage through 180° about said axis, said ratchet means being shifted, upon initiation of rotation of said carriage, out of cooperative relation with said pawl, means cooperating with said table, during such rotation of said carriage, to shift said table to a new starting position relative to said carriage, and other ratchet means operatively connected with said table and engageable by said pawl, after such rotation, to shift said table step-by-step in the opposite direction along said trackway.

8. The machine of claim 1 in which said supporting means comprises a carriage providing a substantially planar trackway, means supporting said carriage for rotation about a substantially central axis substantially perpendicular to the plane of said trackway, a table supported by said trackway for movement therealong and in which said indexing means comprises a pawl mounted adjacent said trackway for vibratory motion generally longitudinally of said trackway, means for driving said pawl through its vibratory path, ratchet means operatively connected to said table and engageable by said pawl to shift said table step-by-step in one direction along said trackway.

9. The machine of claim 1 in which said transfer means comprises a head adapted to span a group of such articles when in such serial arrangement, said head being provided with a perforate face adapted to engage such articles, means for drawing air through said perforate face, and actuating means for said head including means for pressing said face into contact with articles arranged by said positioning means while activating said air-drawing means, means for subsequently lifting said head and shifting the same into registry with said carrier element while maintaining activation of said air-drawing means, means for subsequently depressing said head, while maintaining such registry, to press articles adhering to said surface into contact with said carrier element, and deactivating said air-drawing means, and means for subsequently shifting said head to clear said carrier element and articles supported thereon.

10. In combination, means for positioning a plurality of articles in serial arrangement in a group, means for supporting a carrier element near said positioning means, and transfer means comprising a head adapted to span a group of such articles when in such serial arrangement, said head being provided with a perforate face adapted to engage such articles, means for drawing air through said perforate face, and actuating means for said head including means for pressing said face into contact with articles arranged by said positioning means while activating said air-drawing means, means for subsequently lifting said head and shifting the same into registry with a carrier element on said supporting means while maintaining activation of said air-drawing means, means for subsequently depressing said head, while maintaining such registry, to press articles adhering to said surface into contact with said carrier element, and deactivating said air-drawing means, and means for subsequently shifting said head to clear said carrier element and articles supported thereon.

11. Transfer means comprising a hollow head providing a perforate, downwardly-presented surface, conduit means supporting said head and communicating with the interior thereof and including a substantially vertically-arranged post, guide means supporting said post for axial reciprocation and oscillation about its axis, a source of vacuum, valve means manipulable to any one of a plurality of selective positions respectively providing communication between the interior of said post and said source, providing communication between the interior of said post and atmosphere, or closing the interior of said post against either such communication, and mechanical means for actuating said post and said valve means comprising means for elevating said post, means swinging said post toward one limit of its oscillatory stroke and shifting said valve means to open communication between the interior of said post and said source, means for causing downward movement of said post while maintaining such communication, means for subsequently elevating said post while maintaining such communication, means for subsequently swinging said post toward the opposite limit of its oscillatory stroke while maintaining such communication, means for subsequently causing downward movement of said post and shifting said valve means to close the interior of said post, means for subsequently shifting said valve means to provide communication between the interior of said post and atmosphere as downward movement of said post is arrested, and means for subsequently lifting said post.

12. The transfer means of claim 11 in which said valve means includes a cylindrical, ported collar surrounding the lower, open end of said post within said guide means and oscillable relative thereto about the axis of said post and in which the mechanical means for manipulating said valve means comprises a link operatively connected to an eccentric point on said collar, a lever remote from said collar and connected to said link, a rotary cam operatively engaging said lever, and spring means resiliently retaining said lever in engagement with said cam.

13. The transfer means of claim 11 in which said mechanical means for actuating said post includes a link eccentrically operatively connected to said post, a lever remote from said post and operatively connected to said link, a rotary cam operatively engaging said lever, and spring means resiliently retaining said lever in engagement with said cam.

14. The transfer means of claim 11 in which said mechanical means for actuating said post includes a lever mounted intermediate its ends for oscillation about a substantially horizontal axis remote from said post, yoke means actuable by one arm of said lever, said yoke means being axially fixed relative to said post but said post being rotatable about its axis relative to said yoke means, and rotary cam means operatively connected to depress the opposite arm of said lever, at times.

15. The machine of claim 1 in which said positioning means comprises a floored chute, continuous means substantially paralleling said chute beneath the floor thereof and provided with upstanding separator elements projecting above the floor of said chute and evenly spaced along the length of said continuous means, said separator elements engaging articles lying on said chute floor to move the same through said chute, and including means for depositing articles serially on said chute floor between adjacent separators.

16. The machine of claim 15 including means actuated by said depositing means for driving said continuous means.

17. In combination, a pair of continuous webs having adjacent runs substantially in mutual contact, means for driving said webs to move said adjacent runs at substantially equal lineal velocities in a common direction, a wheel mounted adjacent said runs, upon an axis transverse relative to the direction of movement of said runs, with a point on its periphery in substantially tangent registry with said runs, means for driving said wheel at a peripheral velocity somewhat less than the lineal velocity of said web runs, and a plurality of spring fingers carried at peripherally spaced points on said wheel periphery, the trailing ends of said fingers being free and flaring away from said wheel periphery.

18. In combination, a pair of continuous webs having adjacent runs substantially in mutual contact, means for driving said webs to move said adjacent runs at substantially equal lineal velocities in a common direction, a wheel mounted adjacent said runs with a point on its periphery in substantially tangent registry with said runs, means for driving said wheel at a peripheral velocity somewhat less than the lineal velocity of said web runs, a plurality of spring fingers carried at peripherally spaced points on said wheel periphery, the trailing ends of said fingers being free and flaring away from said wheel periphery, conveyor means arranged adjacent the periphery of said wheel at a point angularly spaced from said webs, said conveyor means being provided with longitudinally-spaced elements projecting, at times, radially inwardly through a projection of the peripheral surface of said wheel, means for driving said conveyor means in a direction opposite the direction of movement of the contiguous portion of the periphery of said wheel, and means carried by said wheel for actuating said conveyor-driving means.

19. The combination of claim 18 in which said conveyor-driving means comprises ratchet means operatively connected to said conveyor means and pawl means coactive with said ratchet means and disposed in the path of said means carried by said wheel.

20. The combination of claim 19 in which said means carried by said wheel comprises a plurality of independently removable striker elements arranged in an annular series and projecting in a common axial direction from an end face of said wheel.

21. In combination, a wheel, means for rotating said wheel, means for temporarily retaining articles in a peripherally-spaced series on the periphery of said wheel, conveyor means arranged adjacent said wheel for serially removing such articles from such wheel, said conveyor means including separator elements defining longitudinally spaced compartments for the reception of such articles, means for driving said conveyor means past said wheel, and means carried by said wheel for actuating said conveyor driving means.

22. The combination of claim 21 in which said conveyor driving means comprises ratchet means operatively connected to said conveyor means and pawl means coactive with said ratchet means and disposed in the path of said means carried by said wheel.

23. The combination of claim 22 in which said means carried by said wheel comprises a plurality of independently removable striker elements arranged in an annular series and projecting in a common axial direction from an end face of said wheel.

24. An article assembling machine comprising means for transporting articles serially past a glue-applying station, means at said station for applying glue to an exposed portion of each article passing said station, means for inverting each such article after glue application thereto, means for positioning said inverted articles in groups in serial arrangement, and transfer means for lifting a group of such articles from said positioning means, while maintaining such arrangement, and for pressing the same against a carrier element to attach said articles, in such arrangement, to said carrier element.

25. An article assembling machine comprising means for transporting articles serially past a glue-applying station, means at said station for applying glue to an exposed portion of each article passing said station, means arranged to receive such articles serially from said transporting means and to grip the same while leaving the glue-bearing portion thereof exposed, said last-named means being operative to invert said articles, means for positioning said inverted articles in groups in serial arrangement with their glue-bearing portions downwardly exposed, and transfer means including a suction head engageable with the upwardly-presented faces of the articles of an entire group and operative to lift a group of articles from said positioning means, while maintaining such arrangement, and to press the glue-bearing portions of said articles against a carrier element to attach said articles, in such arrangement, to said carrier element.

26. An article assembling machine comprising means for transporting articles serially past a glue-applying station, means at said station for applying glue to an exposed portion of each article passing said station, means arranged to receive such articles serially from said transporting means and to grip the same while leaving the glue-bearing portion thereof exposed, said last-named means being operative to invert said articles, means for removing said articles serially from said inverting means and for stacking a predetermined number of such articles in superposed registry with the glue-bearing portion of the lowermost article of each stack downwardly exposed, means for pressing the glue-bearing portion of each superposed article in a stack against the subjacent article therein, means for positioning a plurality of such stacks in a group in serial arrangement with the glue-bearing portion of the lowermost article in each stack downwardly exposed, and transfer means including a suction head engageable simultaneously with the upwardly-presented faces of the uppermost articles of all the stacks of a group and operative to lift a group of stacks from said positioning means, while maintaining such arrangement, and to press the glue bearing portions of the lowermost articles of all the stacks of such group against a carrier element to attach said stacks, in such arrangement, to said carrier element.

27. In combination, a floored chute, continuous means substantially paralleling said chute beneath the floor thereof and provided with upstanding separator elements projecting above the floor of said chute and spaced along the length of said continuous means, means for driving said continuous means, a section of the floor of said chute being reciprocable between a position in the general plane of said floor and a position substantially in the plane of the uppermost ends of said separator elements, transfer means cooperable with articles disposed on said reciprocable floor section to lift said articles from said chute, and means providing, at times, a mechanical connection between said transfer means and said floor section to enforce upward movement of said floor section in response to upward movement of said transfer means.

28. The machine of claim 21 including transfer means for removing articles simultaneously in groups from a plurality of adjacent compartments of said conveyor means, transmission means including a clutch for driving said transfer means from said conveyor driving means, and means for disengaging said clutch.

29. The machine of claim 28 in which said clutch comprises two cooperative toothed elements, the spacing between adjacent teeth thereof corresponding to the spacing between adjacent compartments of said conveyor means, and spring means continuously urging said toothed elements toward driving engagement.

30. The device of claim 7 in which said pawl-driving means comprises a shaft, a pivot mounting for said pawl eccentrically supported on said shaft, link means eccentrically connected to said shaft, a rotary cam, means for driving said cam, and spring means resiliently urging said link means toward operative engagement with said cam.

31. The device of claim 30 including a collar embracing said shaft and concentrically oscillable relative thereto, cooperative elements on said shaft and said collar engageable to limit movement of said shaft under the influence of said spring means, and means for retaining said collar in any one of a plurality of positions of oscillatory adjustment relative to the axis of said shaft.

LEO J. SCHANKE.
WILBER W. VAWTER.

REFERENCES CITED

The following references are of record in the file of this patent:

UNITED STATES PATENTS

| Number | Name | Date |
|---|---|---|
| 1,126,003 | Graul | Jan. 26, 1915 |
| 1,824,414 | Stein | Sept. 22, 1931 |
| 1,905,476 | Lorenz | Apr. 25, 1933 |
| 2,016,156 | Neumair | Oct. 1, 1935 |
| 2,121,484 | Massini | June 21, 1938 |
| 2,335,239 | Gladfelter | Nov. 30, 1943 |
| 2,431,320 | Fischer | Nov. 25, 1947 |